Aug. 23, 1932.  J. E. BLALOCK  1,873,106
LIQUID METER
Filed Oct. 15, 1928  2 Sheets-Sheet 1
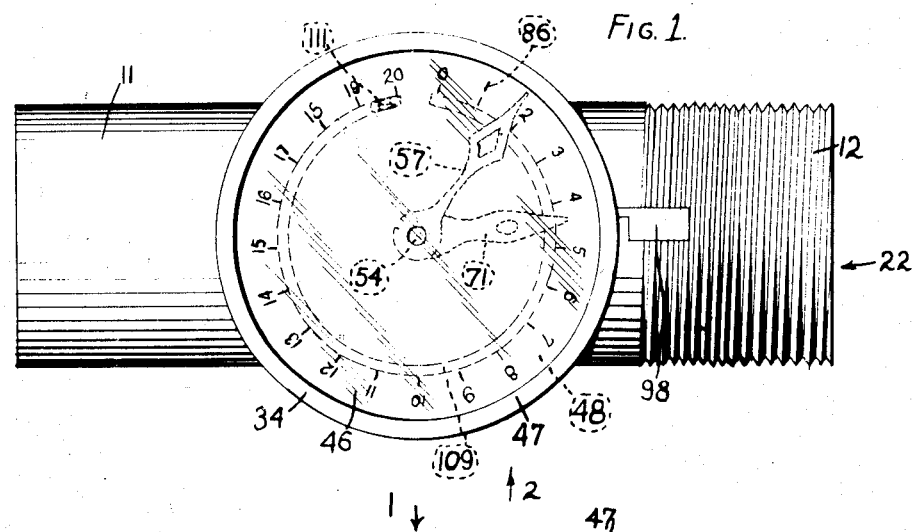
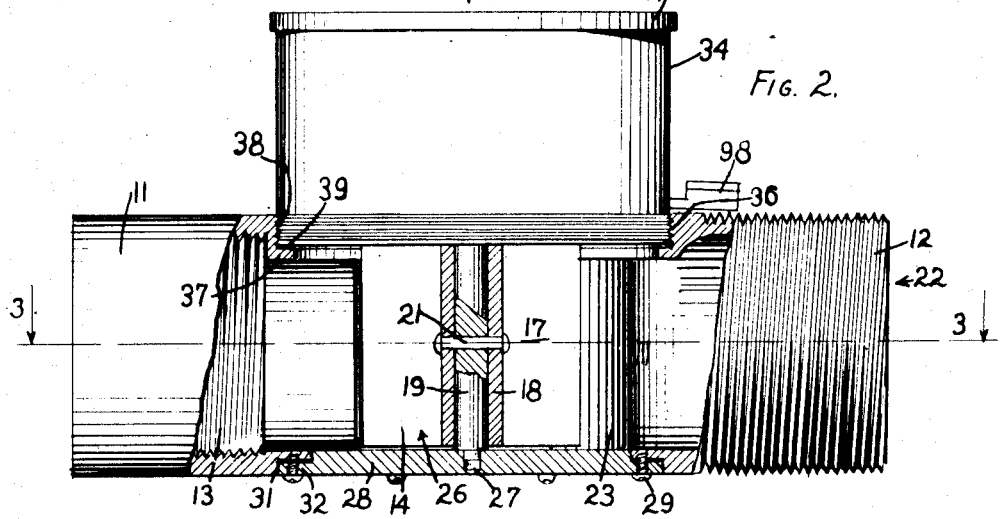
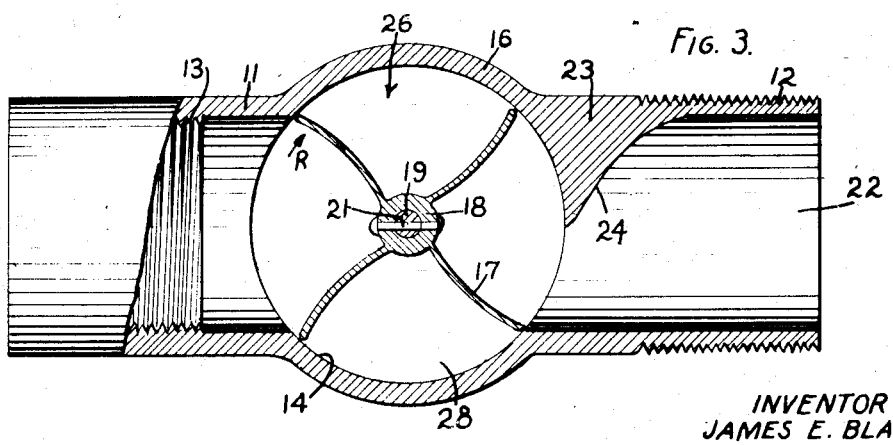
INVENTOR
JAMES E. BLALOCK
BY *Hazard and Miller*
ATTORNEYS Aug. 23, 1932.  J. E. BLALOCK  1,873,106
LIQUID METER
Filed Oct. 15, 1928   2 Sheets-Sheet 2

INVENTOR
JAMES E. BLALOCK
BY Hazard and Miller
ATTORNEYS

Patented Aug. 23, 1932

1,873,106

UNITED STATES PATENT OFFICE

JAMES E. BLALOCK, OF PACIFIC PALISADES, CALIFORNIA

LIQUID METER

Application filed October 15, 1928. Serial No. 312,561.

This invention relates to fluid meters, and more particularly to an improved type of meter for measuring the volume of a fluid passing through a conduit.

An object of the invention is the provision of a metering device of such dimensions and characteristics that it is adapted to be interposed in a flexible conduit such as the gasoline vending tube commonly employed in filling stations. With this object in view, the device of my invention finds particular utility in measuring the quantity of gasoline sold to a customer, because the compact nature of the device permits its being mounted closely adjacent that end of the conduit carrying the nozzle, so that it is possible for the filling station attendant to watch the dial as well as the liquid level within the tank being filled.

Another object is the provision of a liquid meter of the general character described, provided with a plurality of indicating hands movable over a single dial, these hands being so connected by gearing that one of the hands makes a complete revolution while another of the hands is traveling across the face of the dial a distance corresponding on the calibration, to a unit volume of the liquid. Hence, by observation of the hands with respect to the calibrations, it is possible to determine the number of unit volumes of the liquid dispensed, and also the number of fractional parts of a unit volume, thereby enhancing the accuracy with which the measuring device may be read.

A still further object is the provision of a liquid meter of the general class described, which is provided with means for quickly resetting the indicating hands back to zero position in respect to the dial.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a top plan view of a liquid meter incorporating the principles of my invention. The direction of view is indicated by the arrow 1 of Fig. 2.

Fig. 2 is a side elevation, partially in section, the direction of view being indicated by the arrow 2 of Fig. 1.

Fig. 3 is a horizontal sectional view taken through the meter housing and metering chamber. The plane of section is indicated by the line 3—3 of Fig. 2 and the direction of view by the arrows.

Figure 4:
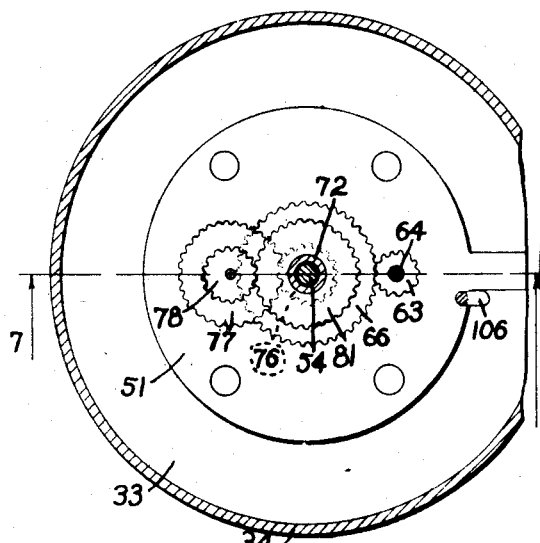
Fig. 4 is a horizontal sectional view taken through the gear chamber. The plane of section is indicated by the line 4—4 of Fig. 6, and the direction of view by the arrows.
Figure 5:
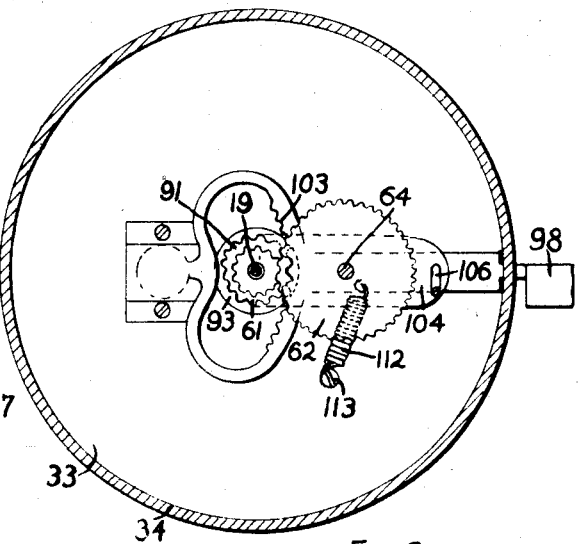
Fig. 5 is another horizontal view taken through the gear chamber, the plane of section being indicated by the line 5—5 of Fig. 6, and the direction of view by the arrows.
Figure 6:
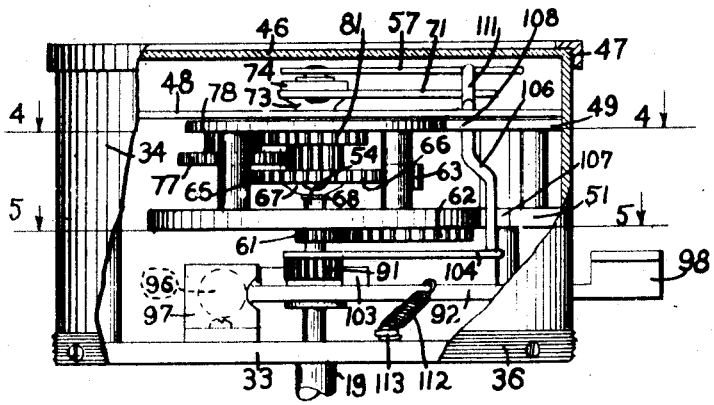
Fig. 6 is a view of the gear chamber in side elevation, a portion of the housing being broken away to disclose the gear assembly.
Figure 8:
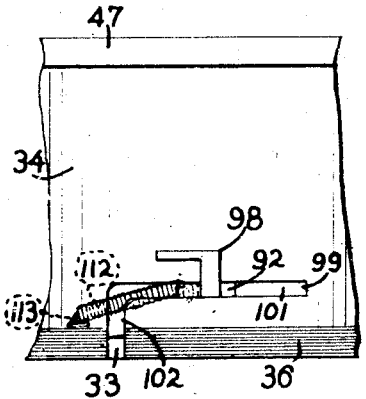
Fig. 8 is a fragmentary view in side elevation, of a portion of the gear chamber.

Specifically describing the invention in the most practical embodiment thereof of which I am at present aware, I have provided an elongated tubular housing 11 provided with external threads 12 at one end, and internal threads 13 at the other end, by means of which the housing 11 may be connected into a conduit. While the device is applicable to any fluid conducting conduit, the housing 11 is particularly designed to be coupled to a flexible conduit such as the gasoline hose commonly employed in gasoline filling stations in vending gasoline. A metering chamber 14 is formed by a slight enlargement 16 of the housing 11; and any suitable metering device such as a plurality of vanes 17, is mounted within the metering chamber 14. While any suitable type of metering device may be employed, for the sake of simplicity I have here shown this member to be a plurality of vanes 17 radiating from a hub 18 which is affixed to a central shaft 19 in any convenient manner such as by a pin 21. The vanes 17 are slightly arcuate; and the vanes are intended to rotate with their convex sides forward as indicated by the arrow R of Fig. 3. In order to direct fluid flowing from the inlet 22 against the back or concave sides of the vanes 17, the tubular housing 11 is constricted adjacent the chamber 14 by means of a web 23 extending from one side of the housing. That side 24 of the web 23 against which the liquid will impinge in flowing toward the chamber 14, is preferably sloping, so as to direct the liquid into the chamber 14 and against the back of the vanes 17, insuring rotation of the metering device which is indicated in its entirety by the numeral 26.

The shaft 19 is journalled at one end in a round recess 27 arranged centrally of, and upon the inner face of a plate 28 which forms a closure for the metering chamber 14, and is removably held in place by a plurality of screws 29 or their equivalent. It is to be observed that the recess 27 within which the shaft 19 is journalled, does not extend through the plate 28, with the result that leakage of fluid through this journal is avoided. A gasket 31 is also interposed between the peripheral flange 32 of the plate 28 and the housing 11.

Figure 7:
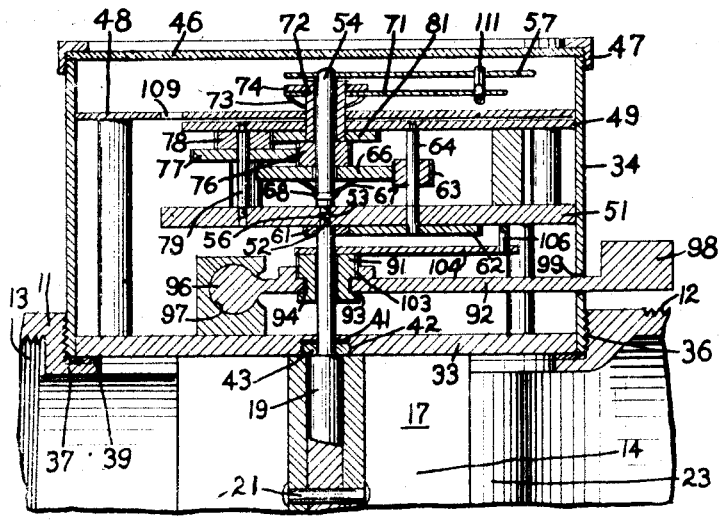
Fig. 7 is a vertical sectional view of the gear chamber and a portion of the metering chamber, portions being broken away to reduce the size of the figure, and the plane of section being indicated by the line 7—7 of Fig. 4, and the direction of view by the arrows.

The other end of the shaft 19 is journalled within, and extends through an aperture arranged centrally of a plate 33 which forms the bottom of the gear housing 34. The housing 34 is provided with external threads 36 adjacent the lower end thereof, by means of which it may be mounted in position in respect to the housing 11 with the shaft 19 and the metering device 26 properly disposed within the metering chamber 14 as clearly shown in Fig. 2. Thus by unscrewing the housing 34 from the housing 11, all the moving parts of the device may be removed as a unit. A flange 37 extends inwardly from the periphery of the threaded aperture 38 in the housing 11 within which the gear housing 34 seats; and a gasket 39 is provided between the bottom of the gear housing 34 and the flange 37 to prevent leakage of fluid. Leakage around the shaft 19 into the gear housing 34, is prevented by means of a packing 41 surrounding the shaft 19 and pressed tightly thereagainst within a stuffing-box 42, by a gland nut 43 threaded into the stuffing-box 42 around the shaft 19, this structure being best shown upon Fig. 7.

The top of the housing 34 is closed by a crystal 46 held in place by a bezel 47, and through which a dial 48 may be observed. This dial is rigid with the housing 34 and is supported upon a bearing plate 49 extending across the housing 34. A second bearing plate 51 also extends across the housing 34 below the bearing plate 49; and the upper end 52 of the shaft 19 is journalled in one end of an aperture 53 extending through the bearing plate 51 centrally of the housing 34. Another shaft 54 has one end 56 thereof journalled in the other end of the aperture 53; and the other end of the shaft 54 extends through the bearing plate 49 and through the dial 48. Thus it is apparent that the two shafts 52 and 54 are journalled in axial alignment with each other, but are not mounted for rotation together. For the sake of convenience, the shaft 19 will be termed the "metering shaft" and the shaft 54 will be termed the "indicating shaft." An indicating hand 57 is affixed to the indicating shaft 54 in position to be moved across the face of the dial 48 as the shaft 54 rotates.

The indicating shaft 54 is connected to the metering shaft 19 to be rotated thereby at reduced speed through a reduction gear train including a gear 61 rigid with the shaft 19, gears 62 and 63 rigid with a shaft 64, and a gear 66 journalled for rotation upon the indicating shaft 54.

The shaft 64 is journalled for rotation in the bearing plates 49 and 51; and the enumerated gears are so proportioned and arranged that the gear 66 revolves at a much lower speed than gear 61.

The indicating shaft 54 is coupled to the last gear 66 of the gear train, by a friction device comprising a resilient washer 67 under compression between a shoulder 68 on the shaft 54 and the gear 66, with the result that the indicating shaft 54 and indicating hand 57 are normally rotated with the gear 66; but it is possible to move the hand 57 and shaft 54 in respect to the gear 66 for the purpose of resetting the hand 57 as will hereinbelow be disclosed.

A secondary indicating hand 71 is mounted for rotary movement upon a sleeve 72 disposed upon the indicating shaft 54 and extending through the dial 48 and bearing plate 49. The secondary indicating hand 71 is coupled to the sleeve 72 to be normally rotated thereby by a friction device similar to that associated with the indicating hand 57, which comprises a resilient washer 73 under compression between the dial 48 and the secondary indicating hand 71, there being a shoulder or analogous structure 74 rigid with the sleeve 72 at its outer end against which the washer 73 compresses the indicating hand 71.

The sleeve 72 is adapted to be rotated at a speed less than that of the indicating shaft 54 but in direct proportion thereto. This is accomplished by means of a secondary gear train including a gear 76 rigid with the gear 66, gears 77 and 78 rigid with a shaft 79 which is also journalled in the bearing plates 49 and 51, and a gear 81 enmeshed with the gear 78 and rigidly carried by the sleeve 72.

The dial 48 is graduated with a plurality of indicia 86. The dial 48 is so graduated that when a unit volume such for example, as a gallon of fluid, has passed through the metering chamber 14 effecting rotation of the shaft 19 as above described, the secondary indicating hand 71 will have moved across the face of the dial a distance to bring it into register with the first indicia 86; and the gear ratio of the secondary gear train is such that while the secondary indicating hand 71 has moved this distance, the primary indicating hand 57 will have made a complete revolution and returned to initial or zero position. Hence, it is possible to determine not only the number of unit volumes of fluid which have passed through the metering chamber 14, but also the number of fractional parts of a unit volume in excess of the number indicated by the secondary indicating hand 71.

Means are also provided for resetting the hands 57 and 71 to zero position in respect to the dial 48. A gear 91 is mounted for rotary and sliding movement upon the shaft 19 between the plate 33 and the bearing plate 51. Axial adjustment of the gear 91 may be effected by means of a lever 92 having a shoulder 93 thereof disposed within an annular groove 94 in the gear 91. The inner end of the lever 92 is provided with a ball 96 seated within a socket 97 rigid with the plate 33, permitting universal movement of the lever 92. The outer end 98 of the lever 92, extends through a slot 99 in the housing 34; a portion 101 of which is arranged horizontally, and another portion 102 of which is disposed vertically. Hence, the lever 92 may be swung about an axis perpendicular to the shaft 19 by sliding the lever within the portion 102 of the slot 99, and then may be swung about an axis parallel to the shaft 19 by sliding through the portion 101 of the slot 99. The lever 92 is provided with an arcuate rack 103 enmeshed with the teeth of the gear 91; and the parts are so proportioned and arranged that movement of the lever 92 throughout the length of the portion 101 of the slot 99, will effect substantially a complete revolution of the gear 91. The gear 91 carries an arm 104 upon the outer end of which is secured a resetting finger 106. This finger 106 extends through slots 107, 108, and 109, in the bearing plates 51 and 49, and dial 48 respectively, each of the slots 107, 108, and 109, being arcuate and extending throughout slightly less than a complete circle, leaving a portion of each of the plates 51 and 49 and dial 109, for the proper support of the respective members. The outer end 111 is adapted to engage both indicating hands 57 and 71, and by rotation of the gear 91, carry the hands 57 and 71 back to initial position. A spring 112 under tension between the lever 92 and a pin 113 rigid with the plate 33, urges the lever 92 toward that end of the portion 101 of the slot 99 into which the portion 102 leads, and also urges the lever 92 into that end of the portion 102 of the slot 99 which is remote from the portion 101. In other words, a spring 112 urges the lever 92 into that position which results in moving the resetting finger 106 to retracted position, it being understood that when in this retracted position, the end 111 of the resetting finger 106, clears the primary indicating hand 57. If desired, the parts may be so proportioned that the gear 91 is permitted sufficient axial movement to withdraw the resetting finger 106 from the plane of movement of the indicating hand 71 also; but since it is improbable that any one sale would result in the dispensing of more unit volumes of the fluid than the complete revolution of the secondary indicating hand 71 would indicate, it is considered sufficient that the resetting finger 106 be withdrawable from the plane of the primary indicating hand 57 only.

The operation of my liquid meter is believed to be obvious from the above detailed description of its constituent parts. When fluid such as gasoline, flows through the housing 11, it effects rotation of the shaft 19 by impinging upon the vanes 17. This revolution of the shaft 19 will effect proportional reduced revolution of the indicating shaft 54, and with it the primary indicating hand 57; and also of the sleeve 72, and with it the secondary indicating hand 71, with the result that the quantity of fluid that has passed through the housing 11 may be ascertained by noting the relative positions of the hands 57 and 71 in respect to the dial 48. The hands 57 and 71 may be reset to initial or zero position by first sliding the lever 92 through the portion 102 of the slot 99, into the portion 101. This will result in axial movement of the gear 91, carrying with it the arm 104 and resetting finger 106, moving the end 111 of the resetting finger 106 into the plane of movement of the indicating hand 57. Then, by moving the lever 92 through the portion 101 of the slot 99, the resetting finger 106 may be caused to traverse the entire length of the slot 109 in the dial 48, with the result that it engages both hands 57 and 71, regardless of their respective positions, and moves them back to the zero position upon the dial 48. This movement of the hands 57 and 71, without similar movement of the gears of their respective gear trains, is made possible because of the frictional connections between the hands and their respective driving mechanisms.

Various changes may be made in the details of the invention as herein described, without departing from the scope thereof as defined by the appended claims.

I claim:

1. In a fluid meter with a housing, a dial carried by said housing, and an indicating hand movable thereover about an axis passing through the dial; a gear journalled within the housing for rotary and axial movement, a lever extending through the housing and mounted for pivotal movement in a plane parallel to the plane of movement of said hand and also for movement about an axis perpendicular to the axis of said gear, a rack carried by said lever in mesh with said gear, a shoulder on said lever engaged with an annular groove in said gear, an arm carried by said gear, and a resetting finger carried by said arm, said finger being adapted to engage said indicating hand when the gear is moved from one extreme of its axial movement.

2. In a fluid meter with a housing, a dial carried by said housing, and an indicating hand movable thereover about an axis passing through the dial; a gear journalled within the housing for rotary and axial movement, a lever extending through the housing and mounted for pivotal movement in a plane parallel to the plane of movement of said hand and also for movement about an axis perpendicular to the axis of said gear, a rack carried by said lever in mesh with said gear, a shoulder on said lever engaged with an annular groove in said gear, an arm carried by said gear, a resetting finger carried by said arm, said finger being adapted to engage said indicating hand when the gear is moved from one extreme of its axial movement, and resilient means urging said lever to retracted position.

In testimony whereof I have signed my name to this specification.

JAMES E. BLALOCK.